United States Patent
Tsuge

(10) Patent No.: US 6,631,948 B1
(45) Date of Patent: Oct. 14, 2003

(54) SEAT ASSEMBLY FOR A BICYCLE

(76) Inventor: Kenji Tsuge, 1-3-16 Higashikaigan, Tsujido Fujisawa-shi (JP)

( * ) Notice: Subject to any disclaimer, the term of this patent is extended or adjusted under 35 U.S.C. 154(b) by 0 days.

(21) Appl. No.: 09/576,649

(22) Filed: May 22, 2000

(30) Foreign Application Priority Data

May 19, 2000 (JP) ........................................ 2000-012442

(51) Int. Cl.[7] ................................................. B60N 2/38
(52) U.S. Cl. ................................................ 297/195.12
(58) Field of Search ........................ 297/195.12, 195.13, 297/201, 215.13, 215.14, 214, 195.1, 232

(56) References Cited

U.S. PATENT DOCUMENTS

| | | | | |
|---|---|---|---|---|
| 810,814 A | * | 1/1906 | Santini | ................... 297/195.12 |
| 2,550,200 A | * | 4/1951 | Murrell | ............. 297/195.12 X |
| 4,089,559 A | * | 5/1978 | Prange et al. | ................ 297/201 |
| 4,387,925 A | * | 6/1983 | Barker et al. | ........ 297/195.13 X |
| 4,541,668 A | | 9/1985 | Rouw | |
| 4,632,453 A | * | 12/1986 | Robbin et al. | ...... 297/195.13 X |
| 5,167,435 A | | 12/1992 | Aldi | |
| 5,709,430 A | * | 1/1998 | Peters | ................ 297/215.13 X |
| 5,988,740 A | | 11/1999 | Caraballo | |

* cited by examiner

*Primary Examiner*—Peter M. Cuomo
*Assistant Examiner*—Stephen Vu
(74) *Attorney, Agent, or Firm*—Edward A. Sokolski

(57) ABSTRACT

A unitary seat assembly for mounting a pair of seats on a bicycle includes a central longitudinal bar portion and a first and second vertical bar portion having different lengths which extend from the central bar portion. Bicycle seats are mounted on the ends of said first and second bar portions, one of said seats being above the pedals of the bicycle while the second seat is positioned either behind or in front of the first seat. The first seat is set at a height to permit the full downward extension of the rider's legs when pedaling while the second seat is set at a height low enough to permit the rider's legs to comfortably reach the ground.

7 Claims, 2 Drawing Sheets

SEAT ASSEMBLY FOR A BICYCLE

BACKGROUND OF THE INVENTION

This invention relates to bicycles and more particularly to a bicycle seat assembly having a pair of in line seats, one for pedaling and the other for use by the rider to hold the bicycle in an at rest position or for mounting and dismounting the bicycle.

DESCRIPTION OF THE RELATED ART.

For getting optimum leverage in riding a bicycle, the rider's seat is generally positioned above the pedals at a distance to permit full extension of the legs vertically with the pedals in their lowermost position. Such full vertical leg extension enables the use of the rider's body weight in pedaling.

It is difficult for the rider to bring at least one of his or her feet comfortably to the ground to hold the bicycle in position from this seated position when stopped or when dismounting. Often, the only way to do so is to dismount the bicycle by placing one foot on a pedal and pulling the opposite leg over the bicycle frame. This is quite inconvenient as, for example, when temporarily halted at a traffic stop. To try to remain on the seat with only one of the rider's feet barely reaching the ground poses a hazard of falling over. Thus, often to avoid this problem, the seat is lowered which results in an undesirable pedaling position.

Bicycles with more than one seat are found in the prior art such as in U.S. Pat. No. 5,988,740 issued Nov. 23, 1999 to Caraballo, U.S. Pat. No. 4,541,668 issued Sep. 17, 1985 to Rouw, and U.S. Pat. No. 5,167,435, issued Dec. 1, 1992 to Aldi. In all of these prior art devices, the seats are positioned side by side; in Caraballo and Rouw enabling a reciprocating up and down motion of such seats to ameliorate rider fatigue; in Aldi providing two seat sections laterally adjacent to each other to facilitate dismounting. Such side by side seat positioning is not directed to and cannot overcome the above described shortcomings of the prior art.

SUMMARY OF THE INVENTION

The device of the present invention employs an assembly for supporting a pair of bicycle seats or a single seat having two sections in an in line relationship. This assembly is attached to the normal bicycle seat mount and supports a first seat which is positioned above the pedals at a height there above which is optimum for pedaling and a second seat which is positioned aft of the first seat above a portion of the rear wheel at a lower height than the first from which at least one of the, rider's legs can comfortably reach the ground to hold the bicycle at rest when stopped. For optimum pedaling, the riding seat should be positioned directly above or slightly forward of directly above the pedal pivot and at a height to permit the rider to fully extend his or her legs with the pedals in their bottom most position.

This end result is achieved by employing a bicycle seat assembly having a central longitudinal bar portion and two vertically extending bar portions which extend normally from the central bar portion. The first of these bar portions is positioned above the pedals and extends in an upward direction a distance great enough to support a first seat(or seat portion) at a predetermined optimum distance from the pedals to permit full vertical extension of the rider's legs when pedaling. The second of these bar portions is positioned above a portion of the bicycle rear wheel and extends a distance great enough to support a second seat(or seat portion) a predetermined optimum distance to enable one or both of the rider's feet to comfortably reach the ground when the bicycle is stopped and rider is in an at rest position. A support bar extends in a direction opposite to that of the first two bars and is attached to the normal bicycle seat support where it can be adjusted in height as may be required to achieve the above indicated end results.

It is therefore an object of this invention to provide an improved bicycle seating device which provides for optimum pedaling and enables the rider to readily hold the bicycle in an at rest position.

It is a further object of this invention to provide an improved bicycle seating device which utilizes a pair of in line seats, one for optimum pedaling, the other for facilitating holding the bicycle in an at rest position.

Other objects of the invention will become apparent in view of the following description taken in connection with the accompanying drawings.

DETAILED DESCRIPTION OF THE INVENTION

Figure 1:
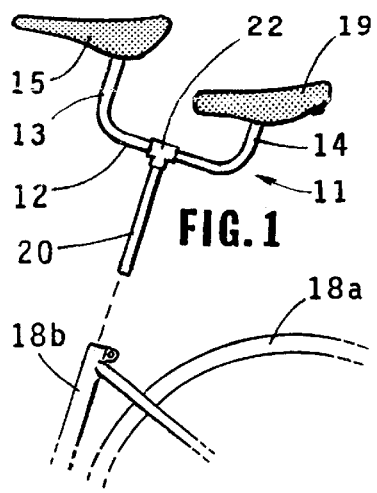
FIG. 1 is a side elevational view of a first embodiment of the invention.
Figure 2:
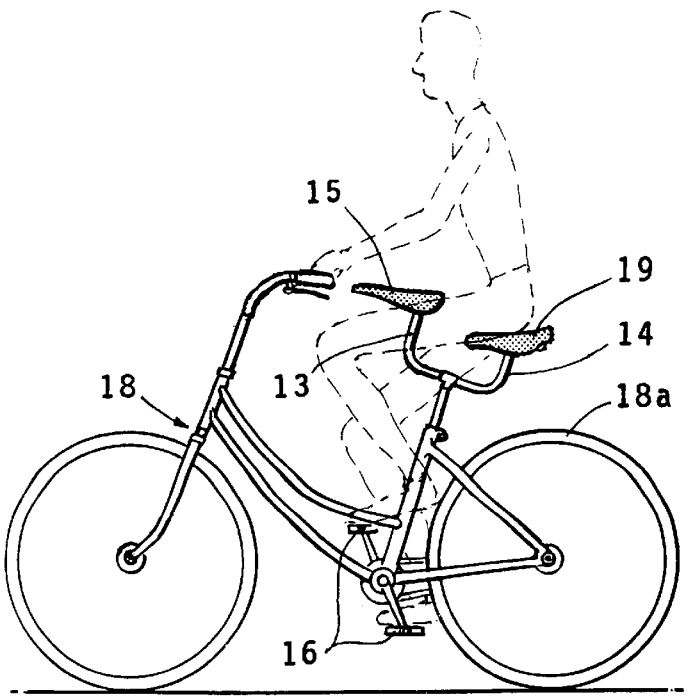
FIG. 2 is a side elevational view showing the first embodiment installed on a bicycle with a rider on the rear seat.
Figure 4:
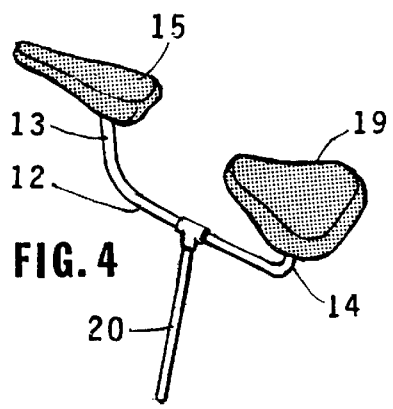
FIG. 4 is a top perspective view of the preferred embodiment.
Figure 3:
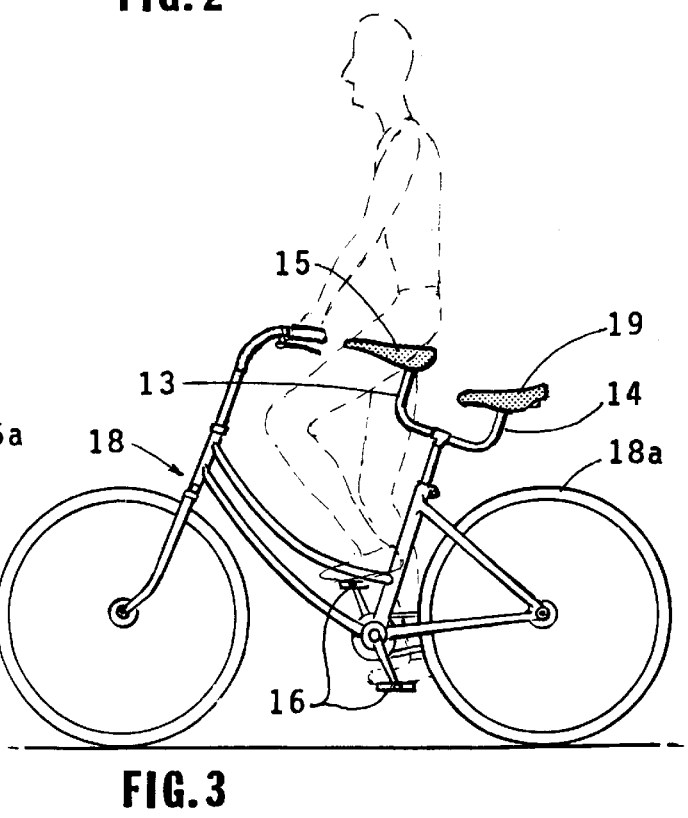
FIG. 3 is a side elevational view of the first embodiment with a rider on the front seat pedaling.

Referring to FIGS. 1–4, a first embodiment of the invention is illustrated. Seat assembly 11 has a central horizontal bar portion 12 and two vertically extending bar portions 13 and 14 which extend substantially normally from the central bar portion. Central bar portion 12 runs through sleeve 22 to which it is clamped. Bar portion 13 extends in an upward direction a distance great enough to support seat 15 at a distance from the pedals 16 of the bicycle 18 to permit full extension of the legs when pedaling, as shown in FIG. 3.

Bar portion 14 is positioned above the forward portion of bicycle rear wheel 18a and extends a distance such as to support second seat 19 to allow at least one of the rider's feet to reach the ground, when the bicycle is stopped and the rider is in an at rest position.

Vertical support bar 20 is attached to sleeve 22 and extends in a direction opposite to that of the bar portions 13 and 14. Bar 20 is adjustably attached to bicycle seat support 18b wherein it can be adjusted in height to bring the seats to the proper position for the rider.

Figure 5:
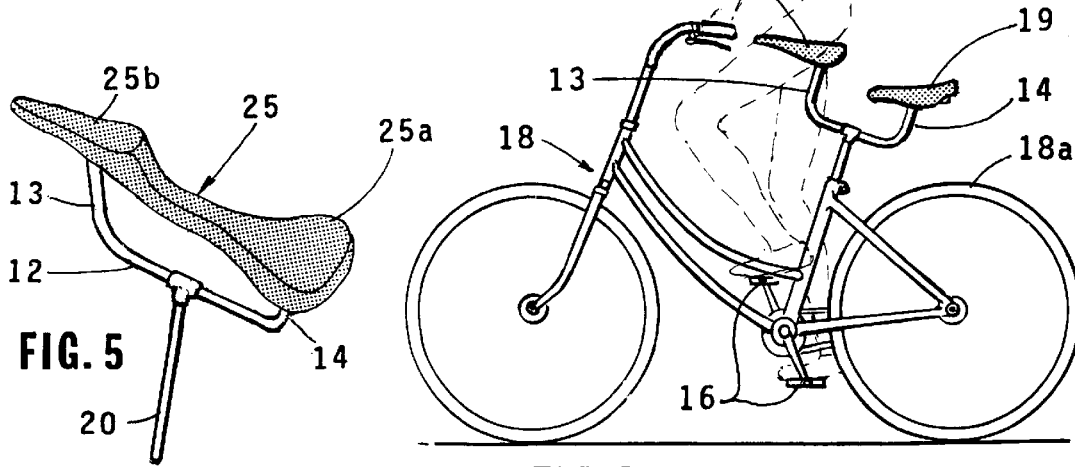
FIG. 5 is a top perspective view of a second embodiment of the invention. of the invention.

Referring now to FIG. 5, a second embodiment is illustrated. In this second embodiment rather than there being two separate seats, a single seat, 25 having a lower seat member 25a and a higher seat member 25b corresponding to seats 19 and 15 is employed. Otherwise this second embodiment is the same as the first.

Figure 6:
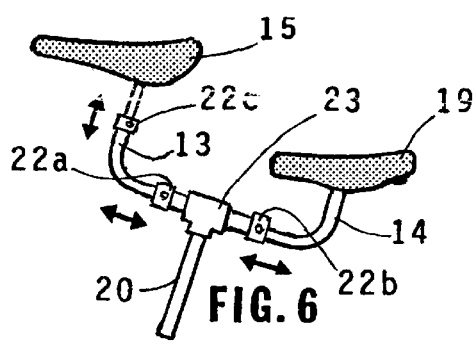

Referring now to FIG. 6, a third embodiment of the invention is illustrated. This embodiment differs from the previous embodiments in that adjuster sleeves 22a–22c are provided to enable adjustment of the positioning of the seats as indicated by the dual arrows in the drawing.

Figure 7:
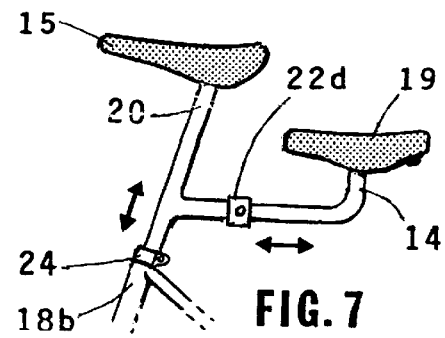
FIG. 7 is a side elevational view of a fourth embodiment of the invention.

Referring now to FIG. 7, a fourth embodiment of the invention is illustrated. In this embodiment, the first seat 15 used for pedaling is supported directly on the bicycle seat support 18b through adjuster sleeve 24 which enables the adjustment of the height of the seat, as indicated by the dual arrows. Further, the second seat 19 is connected to bar 20 through adjuster sleeve 22d which enables adjustment of seat 19 in the directions indicated by the dual arrows.

Figure 8:
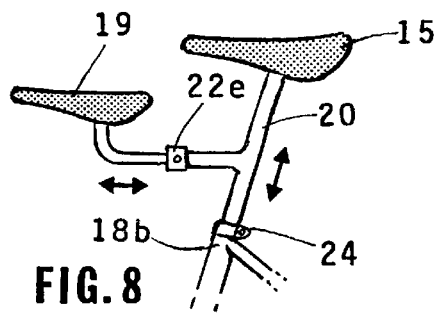
FIG. 8 is a side elevational view of a fifth embodiment of the invention.

Referring now to FIG. 8, a fifth embodiment of the invention is illustrated. In this embodiment, the second seat 19 is forward of the first seat 15 which is used for pedaling and to the rear of the rearward portion of the front wheel of the bicycle. This enables reaching an at rest position by moving forwardly rather than rearwardly which for some persons is easier to handle. As for the previous embodiment the positioning of the seats can be varied by adjusting sleeve adjusters 24 and 22e as indicated by the double arrows in the drawing.

Figure 9:
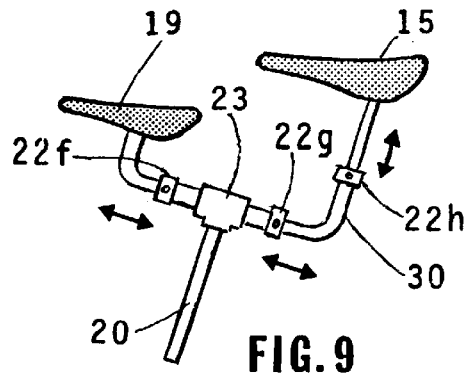
FIG. 9 is a side elevational view of a sixth embodiment of the invention.

Referring now to FIG. 9, a sixth embodiment of the invention is illustrated. This embodiment is similar to the previous embodiment in that the first seat 15 is the higher riding seat. In the embodiment, seat 15 is to the rear of the support bar 20 and the seat support 18b. The seat is connected to angled bar 30 through sleeve adjuster 22h, the angled bar being connected through coupler 2.3 to the support bar 20. Seat 19 is connected to coupler 23 through sleeve adjuster 22f. The sleeve adjusters 22f,22g, and 22h enable adjustment of the seats as indicated by the bidirectional arrows.

Figure 10:
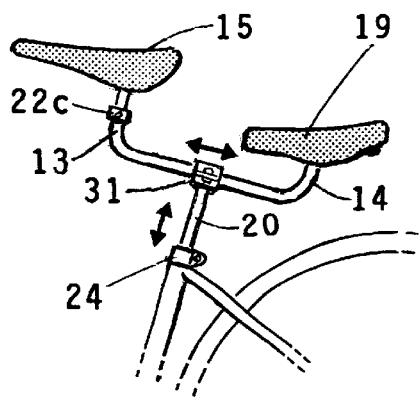
FIG. 10 is a side elevational view of a seventh embodiment of the invention shown installed on a bicycle.

Referring now to FIG. 10, a seventh embodiment of the invention is illustrated. In this embodiment, the position of the seats 15 and 19 can be adjusted left and right on coupler 31 as indicated by the double arrows. The height of the seats by moving support bar 20 up or down as may be required and then tightening coupler 24 to retain the bar in the desired position.

Figure 11:
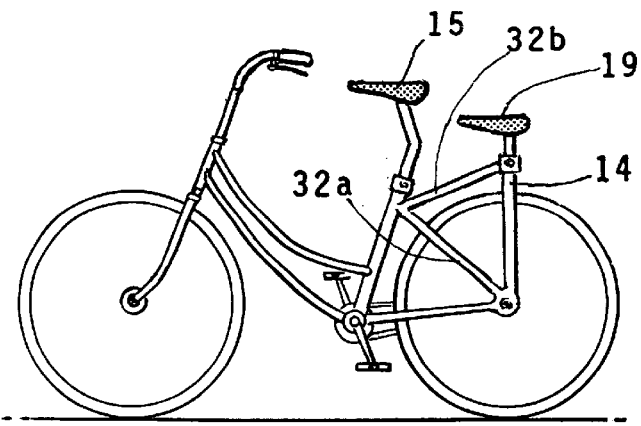
FIG. 11 is a side elevational view of an eighth embodiment of the invention shown installed on a bicycle.

Referring now to FIG. 11, an eighth embodiment of the invention is illustrated. In this embodiment, seat 15 is mounted in its normal position on the bicycle support bar 20. Seat 19 is mounted on support bar 14 attached to the axle of the rear wheel with support bars 32a and 32b providing additional support for the seat.

Figure 12:
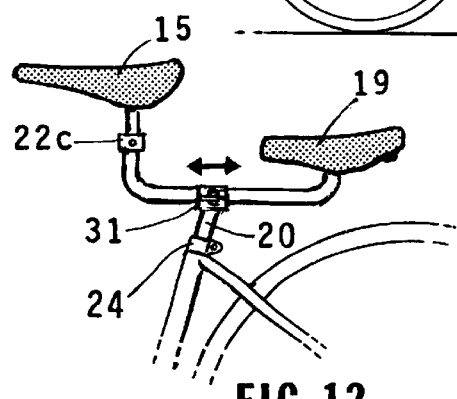
FIG. 12 is a side elevational view of a ninth embodiment of the invention shown installed on a bicycle.

Referring now to FIG. 12 a ninth embodiment of the invention is illustrated. In this embodiment, adjuster sleeve 31 is mounted on the support bar at an angle such that the angle between the support bar for seat 19 and vertical support bar 20 is greater than 90 degrees, this to avoid contact between seat 19 and the rear wheel.

While the invention has been described and illustrated in detail, this is intended by way of illustration and example only, the scope of the invention being limited by the terms of the following claims.

I claim:

1. A bicycle seating assembly for alternately seating a rider in a first or second position on a bicycle having pedals comprising:

first and second seating members, said second seating member being smaller than said first seating member, first means for mounting said first seating member in said first position which is above the bicycle pedals at a distance such that the feet of the bicycle rider just reach the pedals with the rider's legs fully extended, and second means for mounting said second seating member in said second position at a distance from the ground to permit at least one of the rider's feet to reach the ground beneath the bicycle, said first and second seating members being integrated into a unitary assembly, whereby in said first position the rider can efficiently pedal the bicycle and in said second position the rider can readily hold the bicycle at rest.

2. The seating assembly of claim 1 wherein said seating members comprise first and second separate seats.

3. The seating assembly of claim 1 wherein said seating members are formed by a single elongated seat having forward and rear seating portions.

4. The seat assembly of claim 1 wherein said second position is rearwardly of the first position.

5. The seat assembly of claim 1 wherein said second position is forwardly of the first position.

6. The seat assembly of claim 1 and further including bar means attached to the frame of the bicycle for supporting said second seat member above the rear wheel of said bicycle.

7. A bicycle seating assembly for alternately seating a rider in a first or second position on a bicycle having pedals comprising:

first and second seating members, said second seating member being smaller than said first seating member, first means for mounting said first seating member in said first position which is above the bicycle pedals at a distance such that the feet of the bicycle rider just reach the pedals with the rider's legs fully extended, and second means for mounting said second seating member in said second position at a distance from the ground to permit at least one of the rider's feet to reach the ground beneath the bicycle, said first and second seating members being integrated into a unitary assembly, said first and second mounting means comprising a central longitudinal bar portion, a first vertical bar portion extending from said central portion for supporting said first seating member, and a second vertical bar portion extending from said central bar portion for supporting said second seating member, said first vertical bar portion being substantially longer than said second vertical bar portion, whereby in said first position the rider can efficiently pedal the bicycle and in said second position the rider can readily hold the bicycle at rest.

* * * * *